April 28, 1942. N. A. CHRISTENSEN 2,281,138
HIGH PRESSURE REGULATING CONTROL VALVE
Filed March 27, 1941  3 Sheets-Sheet 1
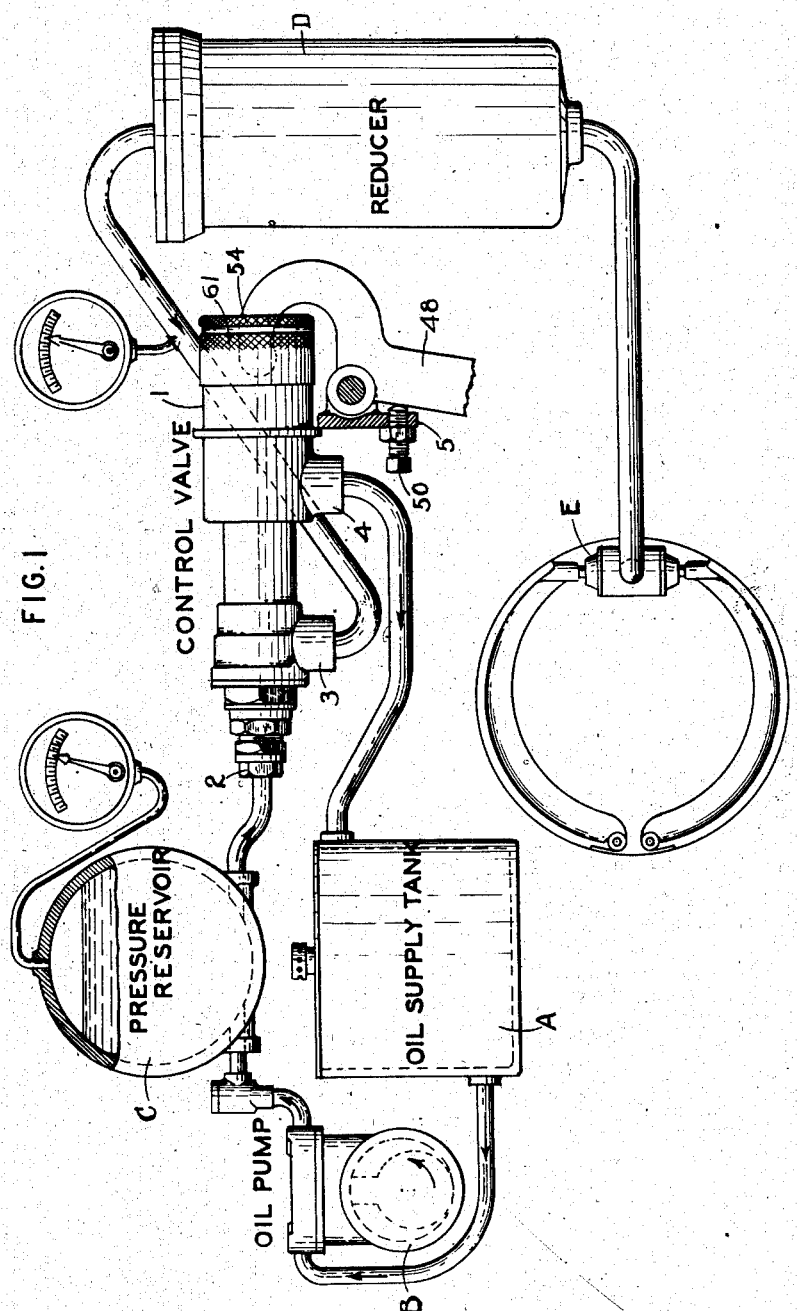
INVENTOR.
NIELS A. CHRISTENSEN
BY April 28, 1942.  N. A. CHRISTENSEN  2,281,138
HIGH PRESSURE REGULATING CONTROL VALVE
Filed March 27, 1941  3 Sheets-Sheet 2
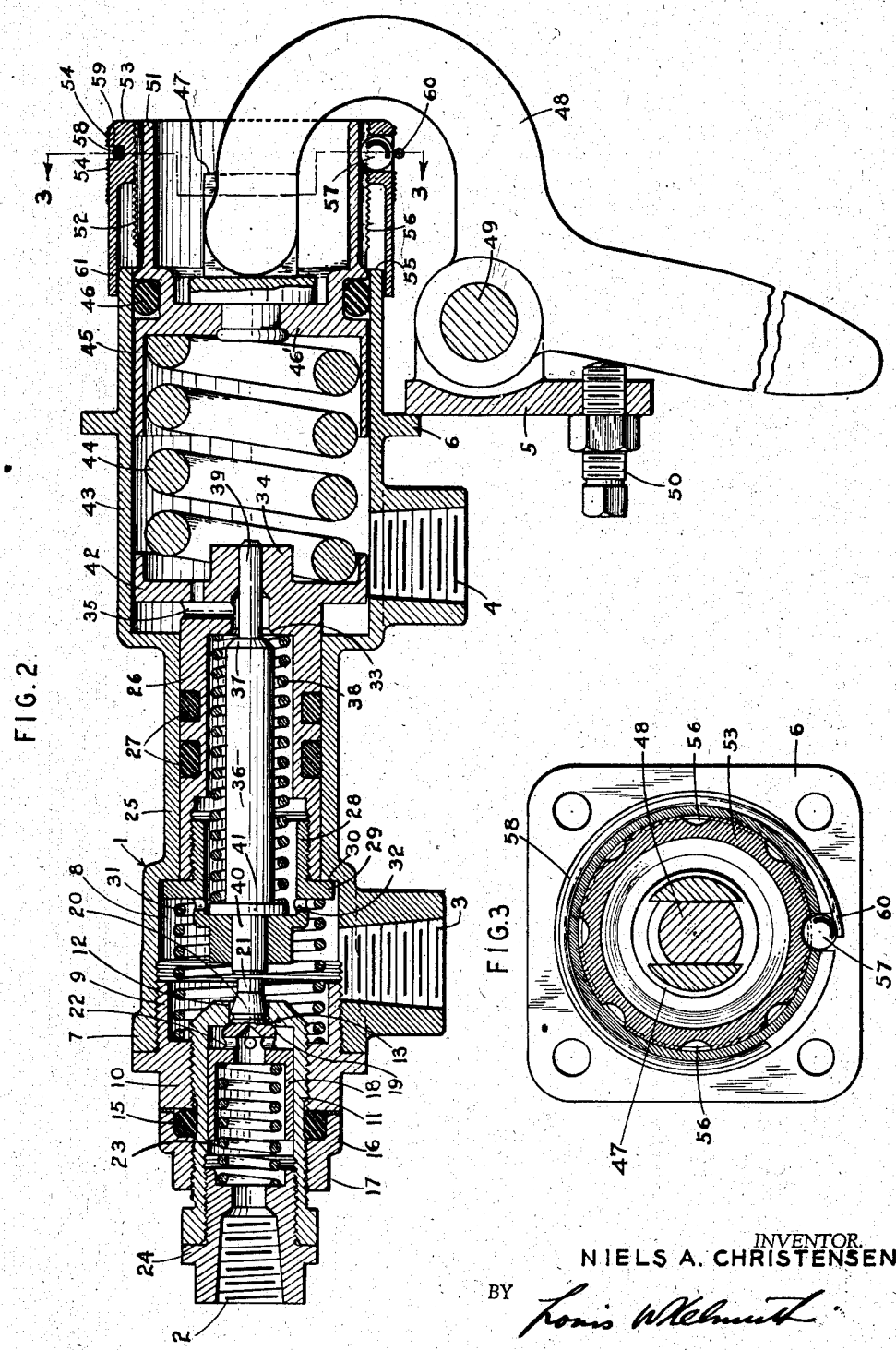
INVENTOR.
NIELS A. CHRISTENSEN.

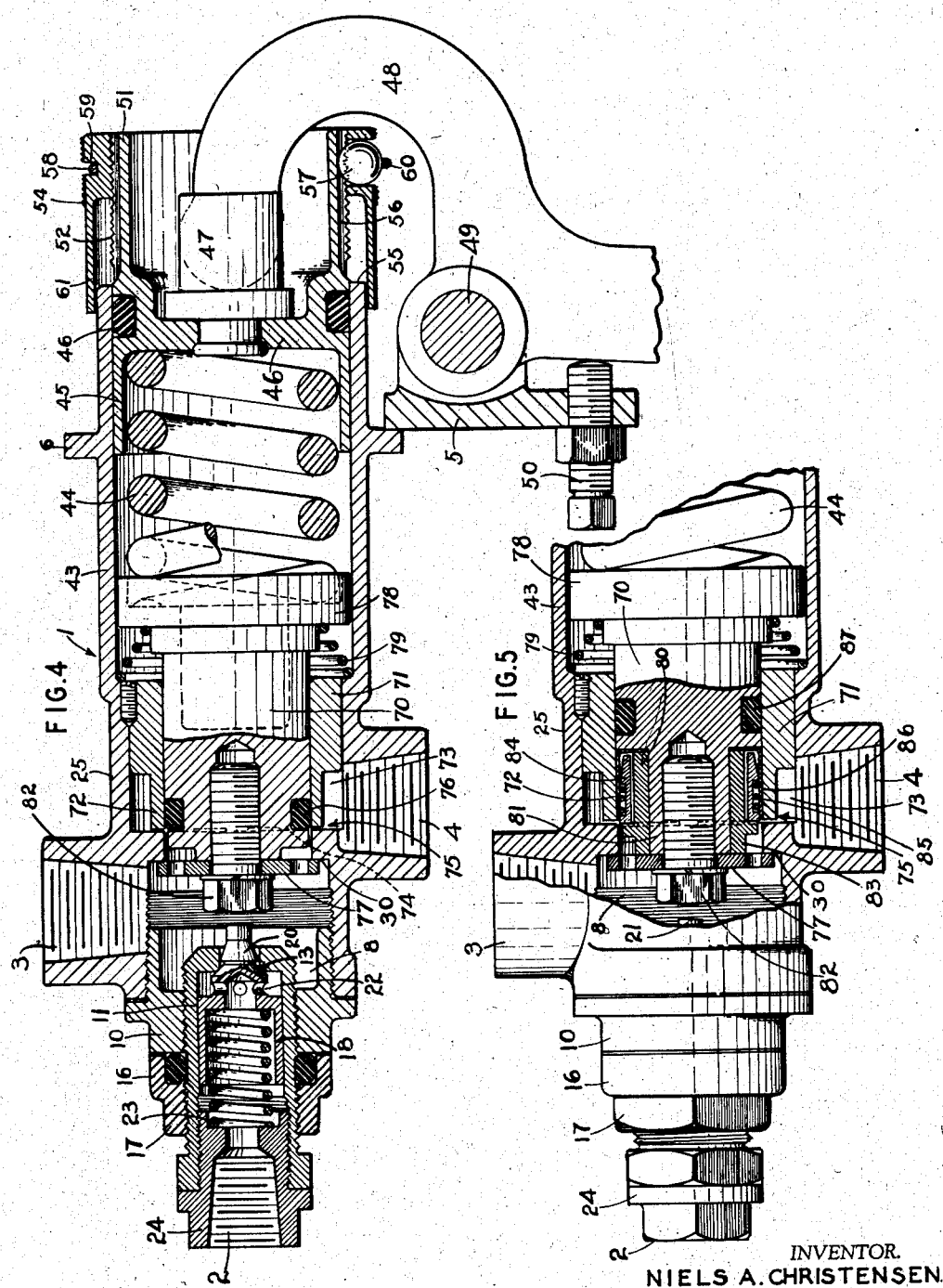

Patented Apr. 28, 1942

2,281,138

UNITED STATES PATENT OFFICE 2,281,138

HIGH PRESSURE REGULATING CONTROL VALVE

Niels A. Christensen, South Euclid, Ohio

Application March 27, 1941, Serial No. 385,497

13 Claims. (Cl. 303—54)

This invention relates to new and useful improvements in high pressure regulating control valves.

An important object is to provide this valve with a readily accessible adjustable metering arrangement whereby any selected maximum pressure can be accurately obtained from a higher source of pressure with a full stroke of the actuator, without stressing the valve parts.

Another object is to provide such valve with a pressure responsive part by which the valve becomes automatically lapped.

Another object is to provide an arrangement of inlet and outlet valves which operate each other and which are arranged with their contact portions opposite and accessible through a port into which a gauge can be inserted for determination of valve clearance.

Another object is to provide one valve with an adjustment for varying the stroke of the actuator for operating the valve.

A still further object is to provide in the above arrangements, simple and efficient packing means to preclude leakage of fluid pressure, and in a modification of the construction, to cause such packing to serve as valve means.

Other objects and advantages will be apparent during the course of the following description.

In the accompanying drawings forming a part of the application and wherein like numerals are employed to designate like parts throughout the several views:

Fig. 1 is a diagrammatic view of the control valve in a system of brakes, although it is to be understood that the application is not to be construed as any limitation.

Fig. 2 is a longitudinal section of the new control valve.

Fig. 3 is a transverse section of the same taken on the line 3—3 of Fig. 2.

Fig. 4 is a longitudinal section of a modified form of control valve, and Fig. 5 is a similar section of a further modification of the form of invention shown in Fig. 4.

In some high pressure equipment, such as used in aviation and motor apparatus, where a head or source of pressure is as high as 1200 pounds per square inch for aileron or elevator operation, it is necessary at times to tap off a lower maximum pressure of say 600 pounds per square inch for the operations of the brakes or some other mechanism from such high pressure source. It has a high pressure inlet 2, a controllable application port 3 and an exhaust 4 which returns exhaust fluid to a supply tank A. Fluid is pumped from the supply by a pump B to a reservoir C having a suitable gauge and, if desired, a head of air under pressure. The application port 3 is connected to a pressure reducer D such as disclosed in my copending application, Serial No. 293,548 which furnishes pressure to a fluid pressure actuated device E. This reducer is only employed where the actuated device is of such construction that high pressure furnished thereto would be dangerous or detrimental and is capable of furnishing a reduced pressure to E while keeping the liquid under low pressure separate from the liquid under high pressure.

Referring now to the detail of this control valve, the numeral 1 designates a cylindrical valve casing having an axial inlet port 2, an application port 3 and an exhaust port 4. This casing is adapted to be secured to a suitable support 5 by means of a flange 6. The outer end 7 is enlarged to form a chamber 8 having the port 3 and which is internally screw threaded to receive a reduced externally threaded end 9 of an end cap 10 having a threaded bore for a threaded engagement with the external threads of a valve cage 11. This cage has its inner end projecting into the chamber 8 and is provided with an axial opening 12 and a valve seat 13. The outer end of the valve cage is formed with a hex head by which it can be turned to axially adjust the cage seat relative to the chamber 8. The intermediate exterior surface is not threaded and is smooth to form a seat for an annular elastic packing ring 15 held against the end cap 10 by a flanged collar 16 terminating in a hex 17 threaded on the external threaded end of the valve cage to seal the packing against the cage.

Within the cage is slidably mounted a hollow inlet valve 18 having a reduced axial conical valve head 19 to engage the seat 13. This head is provided with a reduced axial metering cone 20 to operate in the opening 12 and terminates in an abutment pin 21 adjacent the center of the chamber 8 and opposite the application port 3 therein. In order for fluid to pass through the valve, its end is provided with an axial bore extending into the axial head 19 to terminate in lateral ports 22 therethrough, which open into the interior of the valve cage near the seat 13. The valve is normally pressed against its seat by a coiled spring 23 having its outer end bearing against an externally threaded nipple 24 having the inlet port 2 extending therethrough. Compensation for inaccuracies of manufacture can be made by adjusting the valve cage relative to the exhaust valve. When valve 18 is open fluid may pass from port 2 through the valve body and passage 12 into chamber 8 and thence through the application port 3.

The intermediate port 25 of the valve casing 1, is reduced for the slidable reception therein of an elongated hollow piston body 26 having a pair of annular grooves and elastic packing rings 27 such as disclosed in my Patent No. 2,180,795, granted November 21, 1939. The end of the piston adjacent the chamber 8 is counterbored and threaded for the reception of a hollow head 28 having an enlarged piston head 29 operating in chamber 8 and having its retractile stroke limited by engagement with the shoulder 30 formed by the construction of the intermediate part 25. A coiled spring 31 in chamber 8 engages piston head 29 to normally hold it retracted against the shoulder 30. The end of the piston head disposed in chamber 8 is provided with lateral ports 32 establishing communication at all times between the chamber 8 and the interior of the hollow piston 26. Fluid pressure is exhausted from the valve through the bore in piston 26 terminating in a conical seat portion 33 and pilot bearing 34 having a lateral passage 35. An exhaust valve 36 having a conical portion 37 normally urged off of its seat 33 by a coiled spring 38, is slidably mounted in the piston 26 on integral pilot pins, one 39 slidably mounted in the end 34 and another 40 slidably mounted in the end of piston cap 28 and extending beyond the same in axial alignment with the inlet valve pin 21. The outlet valve 36 is provided with a stop collar 61 engaged by one end of the spring 38 to normally hold the collar against the piston cap 28 with the pin 40 projected as shown to engage the pin 21. These pins may normally abut each other when the valve is in release position or be slightly spaced apart depending upon the time operation desired, and when so spaced can be readily measured for clearance therebetween by the insertion of a gauge through application port 3, since the adjacent ends of the pins are normally disposed opposite this port. The tolerance allowed can be readily adjusted by loosening the nut 17 and adjusting the inlet valve cage 11 and inlet valve 18 axially in or out with respect to the pin 40. The inlet valve spring 23 is stronger than outlet valve spring 38 so that the valves can arrive at a lapped position during application and when the piston 26 has been forced outwardly to cause tension of spring 23 to hold the inlet valve 19 closed and to tension spring 38 sufficiently to move the outlet valve 37 to its seat 33. In this position during application, the piston 26 will be advanced by operator's pressure with the head 29 spaced from shoulder 30, so that if excess pressure exists in chamber 8 at any time, it will force the piston 26 rearwardly to carry seat 33 away from the outlet valve 37 to exhaust excess pressure through the exhaust port 4 until the pressure in chamber 18 conforms to the setting of the valve which will now be described. Spring 23 being stronger than spring 38, causes the exhaust valve 37 to be closed prior to opening of inlet valve 19, after which the bottoming of exhaust valve caused by the advance of the piston 28 and valve seat 33, causes a positive opening of the inlet valve by its engagement with pin 40. Any retractive movement of piston 28 by pressure in chamber 8 or partial release of operator pressure will temporarily seat inlet valve 19 and unseat the exhaust valve, permitting slight venting of chamber 8 until the desired pressure in the chamber has been attained.

The inner end of piston 26 is provided with an enlarged spring centering cup 42 operating in the enlarged inner end 43 of the valve casing which is provided with the flange 6 for mounting. Operator's pressure is exercised upon the piston 26 through a metering spring 44 engaging the cup 42 and a piston 45 having a packing 46 as in my Patent No. 2,180,795 slidably engaging the valve casing cylinder 43. The metering spring 44 is free and without tension in a release position of the device. The piston 45 is provided with a head 46', axially on which is mounted a forked jaw 47 to receive the rounded end of an operating lever 48 fulcrumed at 49 on bracket 5. A screw 50 extends through the bracket 5 to engage the lever 48 for adjustably limiting its retractile movement. Its forward applying movement to a variable predetermined maximum limit resulting in a predetermined maximum pressure to be released by the valve, is provided by an adjustment which is simple and within easy reach of the operator for rapid adjustment. This consists of providing the piston 45 with an axially extending annular extension 51 which projects beyond the inner end of the valve casing and is provided with external screw threads 52, upon which is adjustably mounted an internally threaded stop collar 53 having an external knurled surface 54, whereby it can be turned and moved longitudinally relative to the extension 51 to vary its abutting distance from the end 55 of the valve casing. When the lever 48 is operated to move the piston 45 inwardly in the casing, its movement is limited by the collar abutting the end 55 of the casing, thereby placing a limit upon its applying movement irrespective of the amount of manual force exerted upon the operating lever. In order to very accurately corelate the fluid pressure passed by the valve with the extent of lever movement, the extension 51 is provided with a series of grooves 56 equi-distantly spaced about its circumference and extending the full length thereof. The collar 53 is provided with a radial opening therethrough in which a detent ball 57 is positioned and is pressed radially inward to seat in any selected groove 56 lengthwise of the extension by a snap ring 58 positioned in a circumferential groove 59 in the collar with one end 60 thereof fused to the ball detent 57 to resiliently press it inwardly into the selected groove. The collar is provided with a sleeve-like extension 61 which has slight clearance and moves freely over the outside of the valve casing in all positions of adjustment to act as a dust cap preventing the entrance of foreign matter. In fact this collar unit may be termed a micrometer sleeve adjustment of the metering spring 44 to increase or decrease the maximum allowable brake pressure in the application port 3 independently of the high pressure supplied to inlet port 2. For example, if the extension 51 has 18 threads per inch, one turn of collar 53 would provide 1/18 of an inch travel or .0555 of an inch, which divided by the number of grooves 56 (8 in number) around the circumference of the extension, would provide a difference of .007" in metering spring length for each ⅛ turn of the collar, or a difference of about ten pounds per square inch in the brake line pressure.

The operation of the valve is as follows:
After the pressure adjustment has been made and the operating lever 48 is actuated to move the piston 26 to the left, the exhaust valve pin 40 first contacts the inlet valve pin 21. Since the spring 23 of the inlet valve is stronger than spring 38 of the exhaust valve, the latter will be compressed to permit the exhaust valve 37 to move to its seat 33 to close. Slight further movement of the operating lever will cause slight compression of the metering spring 44 until it overpowers inlet valve spring 23 to cause opening of the inlet valve 19 to admit high pressure to the chamber 8 and application port 3. When pressure against the piston 26 is sufficient to overcome the exertion of the metering spring 44 in the then position of operating lever, the inlet valve 19 will automatically close. When this pressure and the opposite exertion of the metering spring are balanced, both the inlet and exhaust valves are closed. The slightest movement of the operating lever either way will either open the inlet valve to admit more pressure, or moving in the opposite directions will open exhaust valve and close the inlet valve to let some pressure out. In either case, a new balance of pressure will be set up instantly to close or lap both valves. Consequently, modulations for increase or decrease of application pressures are under direct and positive control of the operator with the least possible amount of pedal pressure. Whenever the operating lever 48 is moved to admit the maximum operating pressure for which the valve is set by collar 53, the latter will abut the end 55 of the valve casing and stop any further applying movement of the lever. Upon release or full retraction of this lever, the inlet valve will close and the exhaust will open to permit pressure in chamber 8 to be exhausted through ports 32, hollow piston 26, valve seat 33, port 35, through the piston 42 and thence out through exhaust port 4. In case it is desired to adjust the clearance between the pins 21 and 40 of the valves; the end cap 17 is loosened to free the inlet valve cage 11 so that it may be turned in or out to adjust its seat 13 and inlet valve 19 relative to the release position of pin 40. The distance between these pins or valves can be observed or measured with a suitable gauge inserted through the application port 3.

In Figs. 4 and 5, modifications of the valve are illustrated and parts thereof corresponding to Fig. 2 are designated by the same reference numerals. The difference between these forms is in the exhaust valve making it possible to make the assembly more compact and with less parts, particularly the form shown in Fig. 4. In both of these modifications, the intermediate portion of the valve casing where the piston 26 is disposed in Fig. 2, is shortened but still retains the stop shoulder 30 for limiting retractile movement of a piston 70 slidably mounted in a liner 71 having one end fitting and secured to the valve casing 25. The bore diameter of this liner is the same as the bore forming the shoulder 30. The other end 72 of the liner is reduced opposite the exhaust port 4 to provide an annular exhaust chamber 73 communicating therewith. The end 72 is provided with axially extending spaced legs 74 engaging the shoulder 30 to space this end from the shoulder and provide an annular slit-type exhaust port 75 communicating with chamber 73. This port is controlled by an elastic packing ring 76 such as is disclosed in my Patent No. 2,115,383 and is positioned in a groove in the piston 70 adjacent its forward end. Secured to this end of the piston by a screw is an enlarged perforated head 77 which when engaged with the shoulder 30, limits the retractile movement of the piston 71, and disposes the ring or valve 76 beyond the port 75 to permit exhaust of chamber 8 through the exhaust slit 75 and port 4.

The rear end of the piston 70 is provided with an enlarged head 78 which engages the metering spring 44. A return spring 79 is positioned between the head and a shoulder of the valve casing for returning the piston 70 to normal release position and for causing the valve ring 76 to uncover the exhaust port 75. By adjusting the liner lengthwise in the valve casing, the size of the exhaust port or slit 75 can be varied.

Fig. 5 is the same construction as Fig. 4, except for the valve packing of piston 70, and corresponding parts are designated with corresponding numerals. Instead of using a composition packing ring for the valve 76 of piston 70, I provide a metallic ring 80 such as is shown in my United States Patent No. 1,727,366. To removably connect this ring with the piston, the forward end of the latter is reduced as at 81 and is internally threaded to receive the screw 82 for holding the head 77 against a sleeve 83. This sleeve has a flange between its ends to engage one end of a split metallic ring 84 held in the annular groove defined between the flange and the larger portion of piston 70. This ring has an annular exterior groove in which is wound the convolutions of a coiled wire spring 85 which presses outwardly upon a bronze cup-shaped sleeve 86 to force its entire circumference into sealing engagement with the liner 7'. To the rear of this metallic cup packing is a safety seal ring 87, similar to the ring 76, and especially effective in forming a seal when liquid under pressure is controlled by the valve. It will of course be understood that the cup 86 acts in the same manner as valve ring 76 in opening and closing the exhaust port 75.

Various changes in the size, shape and arrangement of parts may be resorted to without departing from the scope of the appended claims.

I claim:

1. A pressure regulating and control valve comprising a casing having an abutment thereon and inter-dependent inlet and outlet valves therein, a metering spring in the casing through which said valves are operated, an operator operated plunger in said casing for said spring having an externally threaded axial extension projecting beyond the end of the casing, said extension having a plurality of circumferentially spaced longitudinally extending grooves, a pressure regulating collar threaded upon said extension of adjustability relative to said abutment, and a detent on said collar engageable with any one of said grooves to releasably retain said collar in adjusted positions.

2. A pressure regulating and control valve comprising a casing having an abutment thereon and inter-dependent inlet and outlet valves therein, a metering spring in the casing through which said valves are operated, an operator operated plunger in said casing for said spring having an externally threaded axial extension projecting beyond the end of the casing, said extension having a plurality of circumferentially spaced longitudinally extending grooves, a pressure regulating collar threaded upon said extension for adjustability relative to said abutment, and a detent on said collar engageable with any one of said grooves to releasably retain said collar in adjusted positions, and a sleeve integral with said collar extending over the end of said casing in all adjusted positions of the collar.

3. A pressure control valve comprising a casing having an application chamber and an application port, a spring pressed inlet valve mounted axially of said casing and projecting into said application chamber thereof, an exhaust valve mounted for reciprocation in said casing and projecting into said application chamber to be normally spaced from said inlet valve at a point opposite said application port to open said inlet valve after closing of the exhaust valve, and operator operated means for operating said exhaust valve.

4. A pressure control valve comprising a casing having an application chamber and an application port, a valve cage adjustable longitudinally of the casing and having an axial external part by which it can be adjusted, said cage having a valve seat disposed in said chamber opposite said application port, a spring pressed inlet valve mounted in said cage and normally engaging said seat, said valve having a stem extending axially into said chamber opposite said application port, an exhaust valve mounted for reciprocation in said casing and projecting into said application chamber to be normally spaced from said inlet valve different distances depending upon the adjustment of the inlet valve, and said exhaust valve after closing, adapted to open said inlet valve, and operator operated metering spring means for operating said exhaust valve.

5. A pressure control valve comprising a casing having an exhaust chamber having an annular shoulder at one end thereof, a liner mounted in said casing having a reduced end with portions spaced from said shoulder to define lateral passages, a pressure responsive spring urged piston mounted in said liner and annular shoulder, and movable over said lateral passages, and means on said piston engaging said shoulder to limit retractile movement of the piston.

6. A regulating pressure control valve for diminution of pressure per square inch from a source of high to lower pressures determinable by the operator of the valve by a pre-setting of the valve to limit its opening movement and comprising a valve casing having inlet and exhaust valves to operate one another, a metering spring for applying application force to said exhaust valve, a plunger engaging said metering spring for applying tension thereto, and a sleeve adjustably mounted upon the exterior of the piston and overlapping the valve casing to abut the same whereby only a predetermined movement of the plunger can take place to determine the maximum pressure which can be released from the valve upon full operation thereof.

7. A pressure regulating control valve comprising a casing with inter-dependent inlet and outlet valves therein and one end of the casing having an abutment, a metering spring in said casing through which the valves are operated, an operator operated plunger having a packing slidably engaged with the casing to seal the same against leakage, said plunger having an axial extension projecting beyond the end of said casing and provided with a plurality of grooves, a pressure regulating collar mounted upon said extension for adjustment relative thereto, and a detent on said collar engageable with any one of said grooves to releasably retain said collar various distances from the end of the casing forming said abutment.

8. A control valve comprising a casing having an application chamber, a tubular valve cage adjustable longitudinally of the casing and having an inlet valve seat axially of the casing, a hollow cylindrical inlet valve mounted for movement longitudinally in said cage and having a valve head normally urged upon said seat, and an operator operated pressure responsive piston mounted in said casing and adapted to engage and operate said inlet valve head.

9. A control valve comprising a casing having an application chamber, an inlet valve seat, an inlet valve mounted for movement longitudinally in said casing and having a valve head normally urged upon said seat, a hollow pressure responsive piston reciprocably mounted in said casing and having an axial valve seat at its rear end, an independently axially movable outlet valve mounted in said piston with one end normally urged away from said piston seat and its other end projecting axially beyond the piston for engagement with said inlet valve when said piston is projected to close said outlet valve and to open said inlet valve, a metering spring in said casing engaging said piston, and an operating plunger engaging said metering spring to move the same to operate said piston and valves.

10. A control valve comprising a casing having an application chamber, a tubular valve cage adjustable longitudinally of the casing and having an inlet valve seat axially of the casing, a hollow cylindrical inlet valve mounted for movement longitudinally in said cage and having a valve head normally urged upon said seat, a pressure responsive piston adapted to operate said inlet valve and having a packing slidably engaging said casing, a metering spring in said casing engaging piston, and an operating plunger engaging said metering spring and having a packing slidably engaging said casing to preclude leakage of the medium from the valve casing.

11. A pressure control valve comprising a casing having an annular shoulder at one end thereof, a liner mounted in said casing and having one end reduced and spaced from said shoulder and casing to define an exhaust chamber and a lateral passage communicating the bore in said liner with said exhaust chamber, and a pressure responsive spring urged piston reciprocable in the bore of said liner for opening and closing said lateral passage.

12. A control valve comprising a casing having an application chamber, an inlet valve having an end projecting therein, a hollow fluid pressure responsive piston reciprocably mounted in said casing and having an axial valve seat at its rear end, the forward end of said piston projecting into said chamber and having a flange for limiting its retractile movement, a spring in said chamber normally holding said piston retracted, an independent axially movable outlet valve mounted in said piston, a spring in said piston for normally urging said outlet valve away from said piston seat, a metering spring in said casing engaging said piston, and an operating plunger engaging said metering spring to move the same to operate said piston and valves.

13. A control valve comprising a casing having an inlet valve therein, a fluid pressure responsive piston movable longitudinally in said casing to operate said inlet valve, an unstressed compression spring in said casing having one end abutting said piston, an operating plunger abutting the other end of the spring, an actuator engaging said plunger to move the same and said spring and in turn to move said piston and inlet valve, said spring being compressed upon fluid pressure responsive movement of said piston, and a variable stop adapted to engage said actuator to limit retractile movement to a point where the spring is unstressed and the desired spacing between the piston and inlet valve is achieved.

NIELS A. CHRISTENSEN.